United States Patent
Gunaratne (10) Patent No.: US 11,235,776 B2
(45) Date of Patent: Feb. 1, 2022

(54) SYSTEMS AND METHODS FOR CONTROLLING A VEHICLE BASED ON DRIVER ENGAGEMENT

(71) Applicant: Toyota Motor Engineering & Manufacturing North America, Inc., Plano, TX (US)

(72) Inventor: Pujitha Gunaratne, Northville, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 459 days.

(21) Appl. No.: 16/263,371

(22) Filed: Jan. 31, 2019

(65) Prior Publication Data

US 2020/0247420 A1 Aug. 6, 2020

(51) Int. Cl.
*B60W 40/08* (2012.01)
*G06K 9/00* (2006.01)
*G05D 1/00* (2006.01)

(52) U.S. Cl.
CPC .......... *B60W 40/08* (2013.01); *G05D 1/0061* (2013.01); *G06K 9/00805* (2013.01); *G06K 9/00845* (2013.01); *B60W 2040/0818* (2013.01); *B60W 2040/0872* (2013.01); *G05D 2201/0213* (2013.01)

(58) Field of Classification Search
None
See application file for complete search history.

(56) References Cited

U.S. PATENT DOCUMENTS

| | | | | |
|---|---|---|---|---|
| 4,797,657 A * | 1/1989 | Vorzimmer | ............ | G08B 13/19 340/430 |
| 7,225,976 B1 * | 6/2007 | Moberg | ............... | B60R 25/25 235/380 |
| 7,783,081 B2 * | 8/2010 | Roques | ............... | B64D 45/0056 382/115 |
| 9,082,237 B2 * | 7/2015 | Breed | ..................... | B60R 25/25 |
| 9,566,986 B1 * | 2/2017 | Gordon | ................ | B60W 50/12 |
| 9,690,292 B1 * | 6/2017 | Chan | ................... | G06K 9/00845 |
| 9,990,785 B2 * | 6/2018 | God | ........................ | G07C 9/257 |

(Continued)

FOREIGN PATENT DOCUMENTS

| | | |
|---|---|---|
| CN | 104290745 | 2/2017 |
| JP | 2015032291 | 9/2015 |

(Continued)

*Primary Examiner* — Fekadeselassie Girma
(74) *Attorney, Agent, or Firm* — Dinsmore & Shohl LLP (57) ABSTRACT

Systems and methods for controlling a vehicle based on driver engagement are disclosed. In one embodiment, a method of controlling a vehicle includes determining, using driver data from one or more driver sensors, a driver state estimation of a driver of the vehicle, determining, using environment data from one or more environmental sensors, one or more environment anomalies within an environment of the vehicle, and determining an anomaly category for at least one of the one or more environment anomalies. The method further includes, based on the driver state estimation and one or more anomaly categories, selecting a failure mode, based on the failure mode, selecting at least one failsafe action, and determining an operation of the vehicle in accordance with the failure mode.

20 Claims, 5 Drawing Sheets

(56) References Cited

U.S. PATENT DOCUMENTS

| | | | |
|---|---|---|---|
| 10,407,079 B1* | 9/2019 | Chan | B60W 50/14 |
| 10,460,605 B2* | 10/2019 | Luhmann | B60W 30/095 |
| 2009/0040054 A1* | 2/2009 | Wang | B60W 30/095 |
| | | | 340/576 |
| 2009/0191513 A1* | 7/2009 | Wang | G09B 9/052 |
| | | | 434/69 |
| 2010/0036290 A1* | 2/2010 | Noguchi | A61B 5/165 |
| | | | 600/595 |
| 2011/0130112 A1* | 6/2011 | Saigh | H04M 1/72424 |
| | | | 455/404.1 |
| 2011/0148574 A1* | 6/2011 | Simon | B60R 25/24 |
| | | | 340/5.61 |
| 2014/0019768 A1* | 1/2014 | Pineau | H04W 4/021 |
| | | | 713/186 |
| 2014/0306814 A1* | 10/2014 | Ricci | G06F 16/25 |
| | | | 340/425.5 |
| 2016/0107763 A1* | 4/2016 | Giuliano | G08G 5/0052 |
| | | | 701/29.1 |
| 2016/0307380 A1* | 10/2016 | Ho | H04L 65/1069 |
| 2017/0053108 A1* | 2/2017 | Jakobsson | H04L 63/10 |
| 2017/0210378 A1* | 7/2017 | Gunaratne | B60W 10/18 |
| 2017/0247000 A1* | 8/2017 | Ricci | B60R 16/037 |
| 2017/0270798 A1* | 9/2017 | Ushiba | B60W 30/16 |
| 2017/0327082 A1* | 11/2017 | Kamhi | B60R 25/102 |
| 2017/0368936 A1* | 12/2017 | Kojima | B60W 40/06 |
| 2017/0372059 A1* | 12/2017 | Sindia | G06N 20/00 |
| 2018/0093675 A1 | 4/2018 | Holub | |
| 2019/0020676 A1* | 1/2019 | Laughlin | G06F 21/316 |
| 2019/0147671 A1* | 5/2019 | Yoshizaki | G07C 5/0891 |
| | | | 701/29.1 |
| 2019/0164311 A1* | 5/2019 | Kogure | G06T 7/75 |
| 2019/0171296 A1* | 6/2019 | Kito | G06F 3/017 |
| 2019/0176967 A1* | 6/2019 | Ohata | B64C 13/20 |
| 2019/0188508 A1* | 6/2019 | Zebley | G06F 21/32 |
| 2019/0202464 A1* | 7/2019 | McGill | B60W 30/182 |
| 2019/0232942 A1* | 8/2019 | Liu | B60W 20/19 |
| 2019/0253623 A1* | 8/2019 | Lim | H04N 5/2353 |
| 2019/0253681 A1* | 8/2019 | Lim | G06T 3/4038 |
| 2019/0274018 A1* | 9/2019 | Mosenia | H04W 4/48 |
| 2019/0277671 A1* | 9/2019 | Weissenmayer | G01D 18/002 |
| 2019/0279447 A1* | 9/2019 | Ricci | B60R 25/00 |
| 2019/0325751 A1* | 10/2019 | Altintas | H04W 4/44 |
| 2019/0385025 A1* | 12/2019 | McMichael | G06K 9/00791 |

FOREIGN PATENT DOCUMENTS

| | | |
|---|---|---|
| KR | 101779823 | 10/2017 |
| WO | 2017085981 | 5/2017 |
| WO | 2018029101 | 2/2018 |

* cited by examiner

SYSTEMS AND METHODS FOR CONTROLLING A VEHICLE BASED ON DRIVER ENGAGEMENT

TECHNICAL FIELD

The present specification generally relates to vehicle systems and methods capable of providing autonomous driving, and in particular, systems and methods for controlling a vehicle based on driver engagement and environmental considerations.

BACKGROUND

Drivers of vehicles, such as automobiles, may encounter driving situations that are challenging, such as avoiding a braking vehicle or an object that is crossing the road. Autonomous vehicles are vehicles that are capable of performing some level of computer control of the vehicle. The level of autonomy of an autonomous vehicle ranges from Level 1 (specific functions are done automatically by a vehicle, such as acceleration) to Level 5 (fully autonomous vehicle with driving capabilities better than a driver). Most vehicles today are driven by human drivers but have some autonomous features.

One problem that exists with semi-autonomous vehicles (i.e., vehicles having an autonomy of Level 4 or less) is when to pass control of the vehicle from the vehicle computer to the driver or from the driver to the vehicle computer. In some cases, when a car is in an autonomous mode, the driver or other occupant may be distracted and not in a state where he or she is capable of taking control of the vehicle. In other situations, a driver may be controlling the vehicle but a challenging driving situation may be better maneuvered by vehicle computer control of the vehicle.

SUMMARY

In one embodiment, a method of controlling a vehicle includes determining, using driver data from one or more driver sensors, a driver state estimation of a driver of the vehicle, determining, using environment data from one or more environmental sensors, one or more environment anomalies within an environment of the vehicle, and determining an anomaly category for at least one of the one or more environment anomalies. The method further includes, based on the driver state estimation and one or more anomaly categories, selecting a failure mode, based on the failure mode, selecting at least one failsafe action, and determining an operation of the vehicle in accordance with the failure mode.

In another embodiment, a system for controlling a vehicle includes one or more driver sensors for producing driver data, one or more environmental sensors for producing environment data, and one or more processors. The system further includes non-transitory memory storing computer-readable instructions that, when executed by the one or more processors, causes the one or more processors to: receive the driver data from the one or more driver sensors, receive the environmental data from the one or more environmental sensors, determine, using the driver data, a driver state estimation of a driver of the vehicle, determine, using the environment data, one or more environment anomalies within an environment of the vehicle, and determine an anomaly category for at least one of the one or more environment anomalies. The computer-readable instruction further cause the processor to: based on the driver state estimation and one or more anomaly categories, select a failure mode, based on the failure mode, select at least one failsafe action, and determine an operation of the vehicle in accordance with the failure mode.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are generally directed to systems and methods of controlling a vehicle based on driver engagement. More particularly, embodiments monitor both a driver and the environment to automatically determine whether the driver should be in control of the vehicle or a vehicle computer should be in control of the vehicle. Embodiments collect current information from driver sensors regarding the behavior and physiologic conditions of the driver, as well as current information from environmental sensors (i.e., surround perception sensors) on board the vehicle to detect features of the roadway and surrounding objects. Based on driver and environment data, embodiments specify failure modes and conditions for failure actions that are broadcast to one or more vehicle processors that handle failsafe actions (e.g., slow down, change lanes, stop, and the like). A failsafe actuation module communicates with a driver state monitoring module to determine whether the driver is capable of handling the demands of controlling the vehicle based on environmental conditions. If the driver is deemed to be not capable of controlling the vehicle, the system decides the best failsafe action based on the severity of the situation and eithers changes the route or stops the vehicle.

In this manner, control of the vehicle is determined based on the condition of the driver, the condition of the environment, and the condition of the vehicle.

Although embodiments herein are described in the context of automotive vehicles, embodiments are not limited thereto. For example, the vehicle control systems described herein may be configured and compatible for use with various transportation systems, including, for example, motorcycles, bicycles, watercrafts, aircrafts, and/or the like. Other uses should generally be understood and are included within the scope of the present disclosure.

Figure 1:
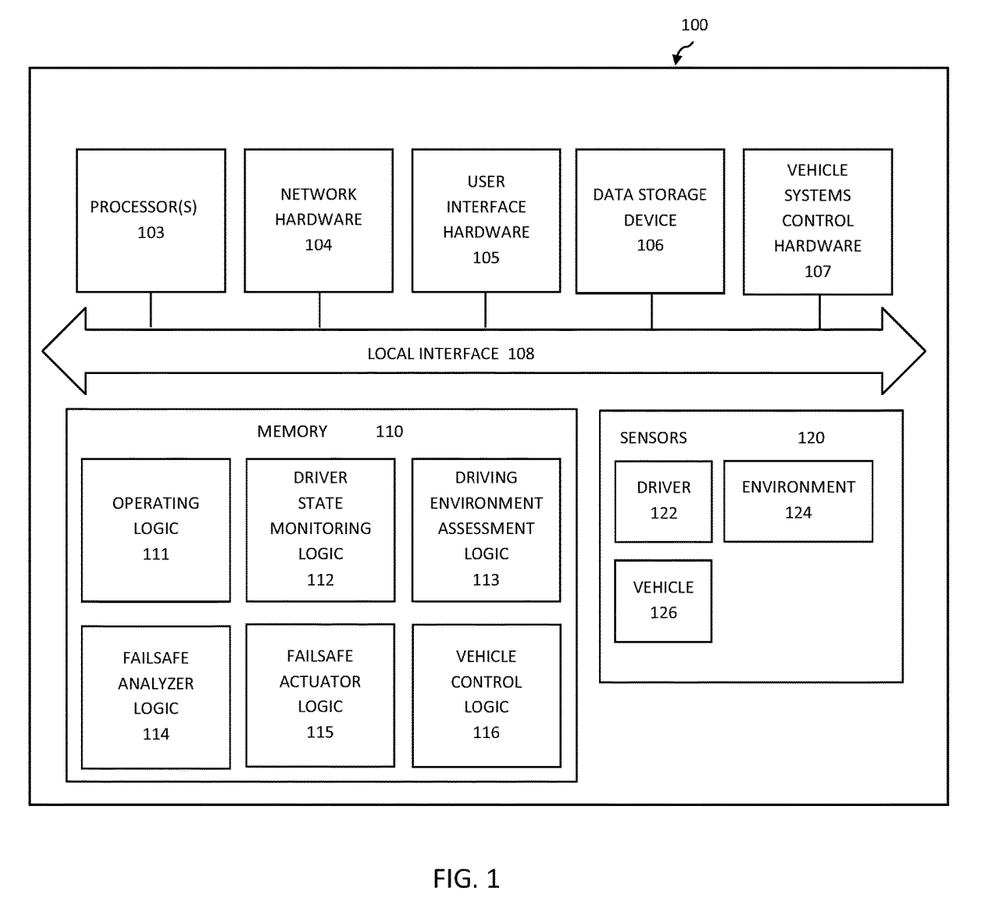
FIG. 1 schematically depicts illustrative hardware components of an illustrative vehicle control system of a vehicle according to one or more embodiments shown and described herein.

Referring now to the drawings, FIG. 1 schematically depicts a non-limiting example of an illustrative vehicle control system 100. In particular, FIG. 1 schematically depicts illustrative hardware components of the vehicle control system 100 that may be used to provide a functionality of the vehicle control system 100 described in further detail herein. Generally, the illustrative vehicle control system 100 depicted in FIG. 1 may be positioned within a vehicle (not shown) and provide particular use in determining the capability of the driver to control the vehicle and when or how to pass control of the vehicle between the driver and computer control. However, it should be appreciated that the vehicle control system 100 is not limited to this use and may be used for other purposes without departing from the scope of the present disclosure.

The example vehicle control system 100 generally includes a non-transitory computer-readable medium containing one or more programming instructions for completing the various processes described herein, which may be embodied as hardware, software, and/or firmware, according to embodiments shown and described herein. While in some embodiments the various components of the vehicle control system 100 may be configured as a general purpose computer with the requisite hardware, software, and/or firmware, in other embodiments, the various components of the vehicle control system 100 may also be configured as a special purpose computer designed specifically for performing the functionality described herein.

Still referring to FIG. 1, the vehicle control system 100 may include one or more processors 103, network hardware 104, user interface hardware 105, one or more data storage devices 106, vehicle systems control hardware 107, a non-transitory memory component 110, and one or more sensors 120. A local interface 108, such as a bus or the like, may interconnect the various components. The one or more processors 103, such as a computer processing unit (CPU), may be the central processing unit of the vehicle control system 100, performing calculations and logic operations to execute a program. The processor 103, alone or in conjunction with the other components, is an illustrative processing device, computing device, processor, or combination thereof. The one or more processors 103 may include any processing component configured to receive and execute instructions (such as from the data storage device 106 and/or the memory component 110).

The network hardware 104 may communicate information between the local interface 108 and one or more other components of the vehicle control system 100. For example, the network hardware 104 may act as an interface between the various components described with respect to FIG. 1 and other components of the vehicle control system 100 and/or vehicle, such as user interface hardware 105 that controls information communicated to an occupant of the vehicle, vehicle systems control hardware 107 that control an operation of various vehicle systems within the vehicle, and/or the like. The network hardware 104 may be utilized to transmit one or more commands to the other components of the vehicle control system 100 in some embodiments.

In some embodiments, the network hardware 104 may further include hardware capable of communicating with an external communications network, such as the Internet. The network hardware 104 may facilitate the transmission of wireless signals, such as WiFi, Bluetooth, cellular communication (e.g., 3G, 4G and 5G), satellite communication, and the like, to communicate with external computing devices, such as remote servers, external databases, and the like.

Still referring to FIG. 1, the user interface hardware 105 may include any device, mechanism, system, interactive display, and/or various other hardware components for communicating information from the vehicle control system 100 to an occupant of the vehicle. For example, the user interface hardware 105 may include input hardware, such as a touch screen, button, microphone, and/or other device for receiving inputs from an occupant. The user interface hardware 105 may further include display hardware, such as, for example, a monitor, video card, heads-up display, dashboard display, mirror display, and/or other device for sending or presenting visual data to a user. In some embodiments, a display hardware of the user interface hardware 105 may incorporate audio output hardware that generates and presents audible data to a user, such as, for example, spoken words, tones, music, and/or the like. It should be understood that the user interface hardware 105 may be integrated with the vehicle in various other forms as described in more detail herein.

The data storage device 106, which may generally be a storage medium, may contain one or more data repositories for storing data that is received and/or generated. The data storage device 106 may be any physical storage medium, including, but not limited to, a hard disk drive (HDD), solid-state memory, removable storage, and/or the like. While the data storage device 106 is depicted as a local device, it should be understood that the data storage device 106 may be a remote storage device, such as, for example, a server computing device, cloud based storage device, or the like. Illustrative data that may be contained within the data storage device 106 is described below with respect to FIG. 2.

Still referring to FIG. 1, the vehicle systems control hardware 107 may be one or more hardware components for controlling an actuation, functionality, or operation of various vehicle systems included in the vehicle. As examples, the vehicle systems control hardware 107 may be one or more hardware components for controlling a movement, power, functionality, or operation of various components of the vehicle that influence a movement and steering of the vehicle. For example, the vehicle systems control hardware may include a steering wheel, gas or brake pedal, wheels, and/or the like for controlling a movement, steering, acceleration and/or deceleration of the vehicle. Such hardware components may generally be configured to generate and transmit one or more signals to one or more motors coupled to the vehicle to effect movement of the vehicle or the like. As further examples, the vehicle systems control hardware 107 may also include a heating, ventilation and air conditioning (HVAC) system, a position and/or height of a seat of the vehicle, a window of the vehicle, and/or the like.

Figure 3:
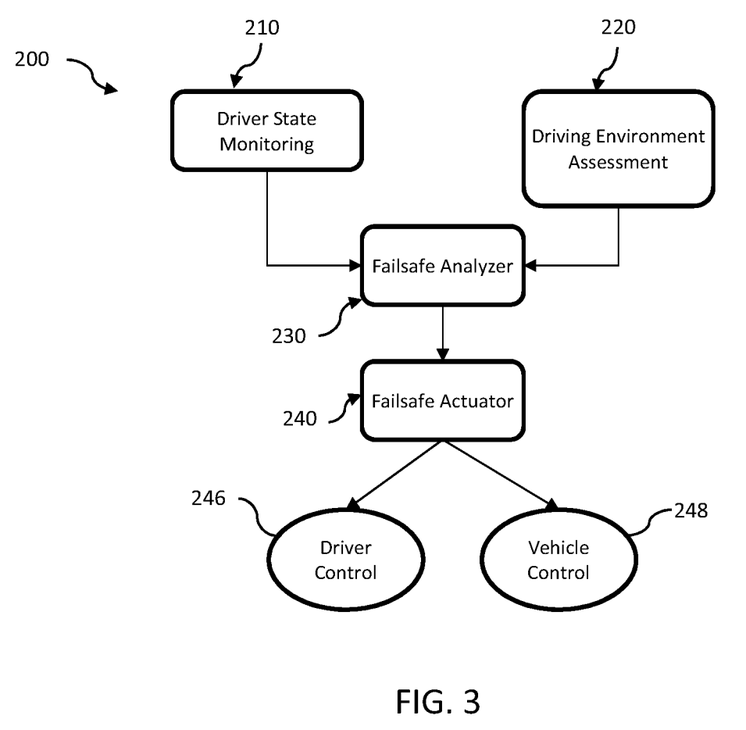
FIG. 3 depicts a flow diagram illustrating a method for controlling a vehicle according to one or more embodiments shown and described herein.
Figure 4:
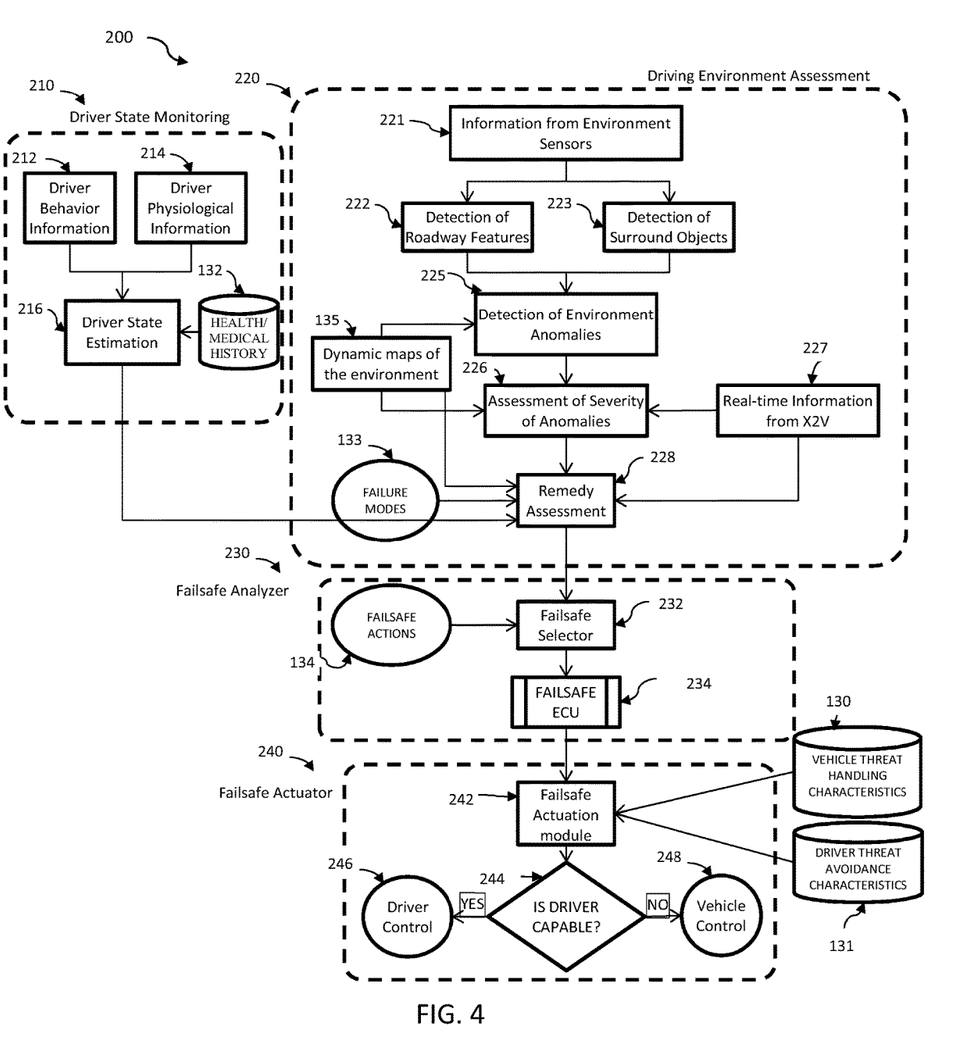
FIG. 4 depicts another flow diagram illustrating a method for controlling a vehicle based on driver engagement according to one or more embodiments shown and described herein.
Figure 5:
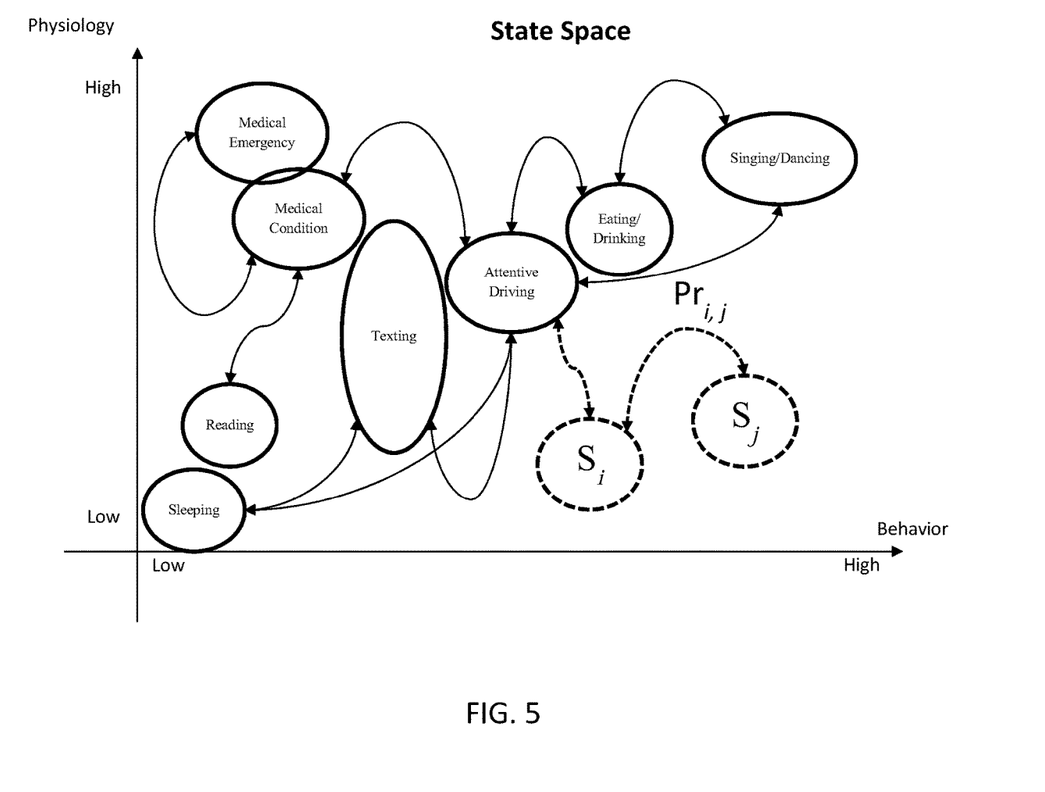
FIG. 5 graphically illustrates a driver state space showing a plurality of example driver states according to one or more embodiments shown and described herein.

The memory component 110 may be configured as a volatile and/or a nonvolatile computer-readable medium and, as such, may include one or more computer-readable instructions (i.e., programming instructions) thereon that, when executed by the one or more processors 103, cause the one or more processors 103 to complete various processes, such as the processes described herein with respect to FIGS. 3-5. The computer-readable instructions stored on the memory component 110 may be embodied as a plurality of software logic modules, where each logic module provides programming instructions for completing one or more tasks, as described in more detail below with respect to FIGS. 3-5.

The program instructions contained on the memory component 110 may be embodied as a plurality of software modules, where each module provides programming instructions for completing one or more tasks. For example, FIG. 1 schematically depicts the memory component 110 containing illustrative logic components according to one or more embodiments shown and described herein. The memory component 110 may be configured to store various processing logic, such as, for example, operating logic 111, driver state monitoring logic 112, driving environment assessment logic 113, failsafe analyzer logic 114, failsafe actuator logic 115, and/or vehicle control logic 116 (each of which may be embodied as a computer program, firmware, or hardware, as an example). The operating logic 111 may include an operating system and/or other software for managing components of the vehicle control system 100. The driver state monitoring logic 112 may include one or more programming instructions for initiating operation of one or more sensors 120 of the vehicle control system 100 to detect and record driver behavior and characteristics of a driver located within the vehicle and positioned proximate to the one or more sensors 120. As described in more detail below, the driver state monitoring logic 112 may determine both driver behavior information and driver physiological information. From this information, one or more driver states of the driver are determined (e.g., sleeping, texting, reading, driving, singing, and the like).

Still referring to FIG. 1, the driving environment assessment logic 113 may include one or more programming instructions for initiating operations of one or more sensors 120 of the vehicle control system 100 to detect and record external roadway features and external surrounding objects. The driving environment assessment logic 113 may further include one or more programming instructions for detecting environment anomalies from the detected roadway features and surrounding objects. For example, the detected roadway features and surrounding objects may be compared with map data to determine a confidence level with respect to the detected roadway features and surrounding objects. When the confidence level is low, it may signify environment anomalies with respect to the environmental detection of features and objects. Such environment anomalies may be due to poor visibility, sensor malfunction, unreliable sensor data, environmental changes (e.g., changed traffic pattern since map data was generated), map data unavailability, erratic system interference, and the like. Based on the environment anomaly or environment anomalies, the driving environment assessment logic 113 may select one or more failure modes, as described in more detail herein.

The failsafe analyzer logic 114 may include one or more programming instructions for receiving as input the one or more failure modes, and selecting one or more failsafe actions based on the received one or more failure modes. As described in more detail below, examples of failsafe actions include, but are not limited to, KEEP_LANE, SLOW_DOWN, CHANGE_LANE, HAZARD_ON, PARK, and CALL_EMERGENCY.

Embodiments of the present disclosure are not limited by the type of failsafe action, which may be any vehicle action that is deemed best in view of the current driving situation, the driver state, and the one or more failure modes.

Still referring to FIG. 1, the failsafe actuator logic 115 may include one or more programming instructions for receiving as input the one or more failsafe actions and making a determination if, based on the current driving situation and environment, control of the vehicle should be performed by the driver or if control of the vehicle should be performed by a vehicle computer (e.g., one or more processors 103) (i.e., autonomous control). The decision of whether or not the situation calls for driver control or vehicle computer control depends on the driver state, the environment anomalies, the failsafe mode, and the availability of one or more failsafe actions. If it is determined that control of the vehicle should be vehicle computer control, the vehicle systems control hardware 107 is autonomously controlled to effectuate the one or more failsafe actions.

The vehicle control logic 116 may include one or more programming instructions for controlling and/or influencing the user interface hardware 105, the vehicle systems control hardware 107, the sensors 120 and/or other devices or components of the vehicle for purposes of facilitating control of vehicle and the functionalities described herein. The vehicle control logic 116 may receive as input instructions corresponding to one or more failsafe actions from the failsafe actuator logic 115, for example.

Still referring to FIG. 1, the one or more sensors 120 may generally include the various sensors described herein, including, for example, one or more driver sensors 122 capable of monitoring the posture and physiological conditions of the driver. The type of driver sensors 122 is not limited by this disclosure. The sensors may be worn by the driver, or embedded within the cabin of the vehicle. As described in more detail below, driver behavior sensors are capable of determining the posture and activities of the driver, and the driver physiological sensors are capable of generating physiological information of the driver. Non-limiting driver sensors 122 include an imaging sensor, a camera, an infrared sensor, a gaze detector, a pressure sensor, a proximity sensor, a wearable sensor, a heartrate sensor, a blood glucose sensor, a magnetoencephalography (MEG) sensor, a blood pressure sensor, a skin conductance sensor, and a respiration sensor, and a blood oxygenation sensor.

The one or more sensors 120 may also include one or more environment sensors 124 capable of generating data regarding features and objects within the environment surrounding the vehicle. The type of environmental sensor 124 is not limited by this disclosure. Non-limiting example environment sensors include a camera, an infrared sensor, a lidar sensor, a radar sensor, and a proximity sensor. The one or more environmental sensors 124 should be capable of returning data regarding features (e.g., roadway features such as route, terrain, road markings/lines, curves, and the like) and objects (e.g., stop signs, stop lights, pedestrians, other vehicles, bicyclists, and the like). In some embodiments, the one or more environmental sensors 124 may also detect weather, such as rain, fog, snow and the like.

The one or more sensors 120 may also include one or more vehicle sensors 126 that provide vehicle data, such as, without limitation, speed, acceleration, location, altitude, direction of travel, steering wheel position, braking, engine temperature, battery charge level, fuel level, and the like.

Figure 2:
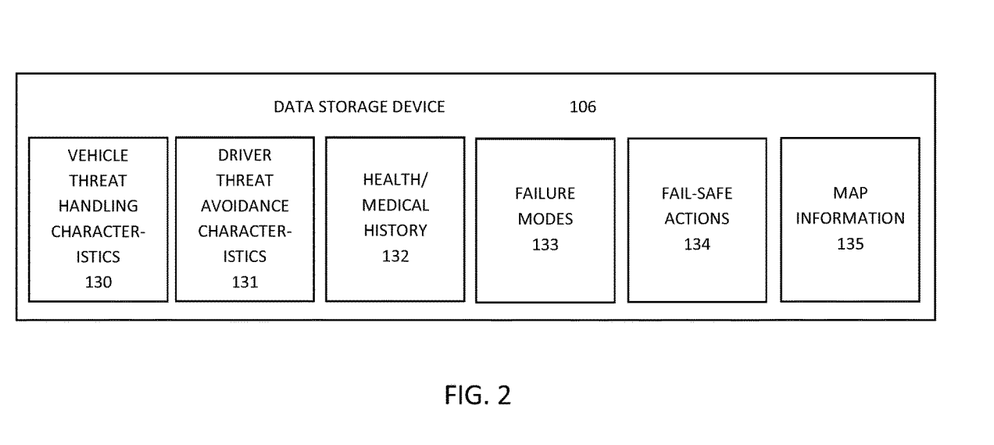
FIG. 2 schematically depicts an illustrative data storage device of the vehicle control system of FIG. 1 containing illustrative data components according to one or more embodiments shown and described herein.

FIG. 2 schematically depicts a block diagram of various non-limiting data that may be stored within a storage device (e.g., the data storage device 106) of the vehicle control system 100, a computing device, and/or a vehicle component according to one or more embodiments shown and described herein. The data storage device 106 may include, for example, vehicle threat handling characteristics data 130, driver threat avoidance characteristics data 131, health/medical history data 132, failure modes data 133, failsafe actions data 134, and map information data 135. It should be understood that less, additional, or different data may be stored.

Vehicle threat handling characteristics data 130 may be stored in one or more databases, either locally in the vehicle or remotely (e.g., in one or more cloud computing devices). As described in more detail below, the vehicle threat handling characteristics data 130 includes information relating to the handling capabilities of the particular vehicle, and may include, without limitation, acceleration capability, top speed, cornering, steering, and braking capabilities. The vehicle threat handling characteristics data 130 may be provided by the manufacture of the vehicle and/or be based on historical driving data derived from the one or more vehicle sensors 126. The failsafe actuator module 240 may utilize the vehicle threat handling characteristics data 130 in determining whether or not vehicle control should effectuate the determined failsafe action and/or whether there should be driver or vehicle control of the vehicle.

Driver threat avoidance characteristics data 131 may be stored in one or more databases, either locally in the vehicle or remotely (e.g., in one or more cloud computing devices). As described in more detail below, the driver threat avoidance characteristics data 131 includes information relating the driving capabilities and/or driving style of the particular driver of the vehicle, driver posture, driver behavior, medical state, past engagement performance, past history of driving, and the like. The driver threat avoidance characteristics data 131 may provide information regarding the ability of the driver to handle a particular driving situation. For example, a timid driver may not be capable of performing an aggressive vehicle maneuver that may be required. On the other hand, a confident driver may be able to maintain control of the vehicle in a challenging driving situation. The driver threat avoidance characteristics data 131 may be derived by historical driving data obtained from the one or more vehicle sensors 126.

Health/medical history data 132 may be stored in one or more databases, either locally in the vehicle or remotely (e.g., in one or more cloud computing devices). As described in more detail below, the health/medical history data 132 may be used by the driver state monitoring module 210 to determine a driver state estimation of the driver. The health/medical history data 132 may be any data relating to a driver's health. In some embodiments, the health/medical history data 132 is obtained from historical medical records of the driver. Further, the health/medical history data 132 may include historical data derived from the one or more driver sensors 122.

The failure modes 133 and the failsafe actions are stored either locally in the vehicle or remotely. As described in more detail below, the failure modes 133 are generated by the driving environment assessment module 220 and are based on driver and environmental factors. The failsafe actions 134 are vehicle control plans that may be autonomously performed by the vehicle depending on the driving situation.

The map information data 135 may be stored either locally in the vehicle or remotely. The map information data 135 includes information regarding the roadway environment, such as, without limitation, road locations, roadway signs, roadway markers, roadway barriers, intersections, buildings, berms, shoulders, traffic lights, geological formations, trees, and the like. The map information data 135 is used by the failsafe analyzer module 230 to generate one or more failure modes, as described in more detail below.

Referring now to FIG. 3, a simplified flow diagram of an example method 200 for controlling a vehicle is graphically illustrated. The functionalities described herein may be performed by the vehicle control system 100 and various logics described above and illustrated in FIGS. 1 and 2. As shown in FIG. 3, the example method 200 utilizes a driver state monitoring module 210 (which may comprise the driver state monitoring logic 112 illustrated in FIG. 1) and a driving environment assessment module 220 (which may comprise the driving environment assessment logic 113 illustrated in FIG. 1).

Generally, the driver state monitoring module 210 gathers data regarding the driver and outputs a driver state estimation. As described in more detail below with respect to FIG. 4, the driver state monitoring module 210 may determine driver behavior information (e.g., how the driver is sitting, what the driver is doing, and the like) and driver physiological information (e.g., driver blood pressure, driver glucose levels, driver heart rate, and the like). Both the driver behavior information and the driver physiological information are used to determine a driver state estimation, which is reflective of the current state of the driver. As described in more detail below with respect to FIG. 5, the driver state estimation may correspond with activities and/or health condition of the driver, such as attentive driving, texting, experiencing a medical condition, and the like. The drive state estimation is provided to the failsafe analyzer module 230.

The driving environment assessment module 220 gathers data regarding the surrounding environment of vehicle, detects environment anomalies, and generates one or more failure modes. The driving environment assessment module 220 gathers roadway feature data (e.g., route, terrain, number of lanes, type of road, roadway markings) and surrounding objects data (e.g., signs, buildings, other vehicles, pedestrians, and the like) using one or more environment sensors 124 and/or one or more vehicle sensors 126. As described in more detail below, these detected roadway features and surrounding objects are compared with known roadway features and known surrounding objects obtained from map information 135 to determine a confidence level and in some cases one or more environment anomalies where the confidence level is below one or more thresholds. The driver state estimation, the one or more environment anomalies, and current driving conditions are used to determine one or more failure modes.

The one or more failure modes are provided to a failsafe analyzer module 230 (which may comprise the failsafe analyzer logic 114 depicted in FIG. 1 and described above), which analyzes a plurality of available failsafe actions (e.g., stay in lane, change lane, stop, etc.) in view of the one or more failure modes. One or more failsafe actions are determined by the failsafe analyzer module 230, which passes the one or more failsafe actions to a failsafe actuator module 240 (which may comprise the failsafe actuator logic 115 depicted in FIG. 1 and described above). The failsafe actuator module 240 evaluates the vehicle threat handling characteristics data 130, the driver threat avoidance characteristics data 131, and current state of the driver to determine whether or not the driver is capable of handling the anomalies and associated threats. If it is determined that the driver is capable, then control is transferred to (or maintained with) the driver and appropriate driving guidance is given by the vehicle (e.g., visual or audible warnings/guidance). Otherwise, the system will autonomously control the vehicle in accordance with the appropriate failsafe action suitable for the situation.

Referring now to FIG. 4, a more detailed flow diagram of the example method 200 depicted in FIG. 3 is graphically illustrated. The example driver state monitoring module 210 comprises a driver behavior information module 212 and a driver physiological information module 214. The driver behavior information module 212 is operable to detect a physical behavior of the driver, such as the driver's posture, a driver's activity, hand positions, feet positions, gaze locations, and the like. The driver behavior information module 212 receives as input data from the one or more driver sensors 122. The one or more driver sensors 122 may include, but are not limited to, imaging sensors (e.g., cameras), infrared sensors, gaze detectors, pressure sensors, proximity sensors, and the like. Multiple driver sensors 122 may be positioned within the vehicle such that various portions of the driver may be viewed from different viewpoints to capture the face, upper body (including the torso and hands), and lower body (legs and feet).

Driver positions and activities are recorded from multiple driver sensors 122, the driver data of which is provided to the driver behavior information module 212. The driver behavior information module 212 determines one or more of the following driver characteristics: gaze location, head pose, hand position, foot position, and body pose. These driver characteristics are estimated from extracted image features and pre-trained models that classify types of behaviors. As a non-limiting example, the program OpenPose extracts key points of a person's face and upper body from image data to derive a pose of the person by mapping a parametric skeleton figure. These parameters of the parametric skeleton figure may be used to generate a quantified measure of body pose in different activities (e.g., driving, texting, reading, sleeping, dancing, and the like). Thus, algorithms are used to extract features from the driver data obtained from the one or more driver sensors 122 to estimate body posture of the driver to detect if the driver in a driving posture or doing other activities.

Additionally, a hand detector algorithm may be run on driver data from one or more driver sensors 122 focused on the driver's hands. As a non-limiting example, a 2-Stage OpenPose may be applied to detect hand joints or wrist locations. The detected hand joints and wrist location data may then be classified by a classification algorithm to detect various hand activities, such as both hands on the wheel, left hand only on the wheel, right hand only on the wheel, no hands on the wheel, one hand holding a cell phone, one or more hands on the lap, one or more hands engaged with an infotainment system, and the like. Thus, the hand detector algorithm may also be used to detect driver activities to determine if the driver is driving or performing other activities. Similar methodologies may be applied to the monitoring of foot activity to detect foot activities such as foot on brake, foot on gas, foot hovering over the brake, foot hovering over the gas, general foot location, foot not on gas or brake, and the like.

It is noted that embodiments are not limited to any pose detection algorithm or classification algorithm, and any suitable algorithms may be utilized. For example, a convolutional neural network may be utilized to classify the various activities described above.

The driver activities stated above may then be used as driver characteristics to determine an estimated driver state by the driver state estimation module 216, as described in more detail below.

The driver physiological information module 215 gathers physiological information of the driver, such as heart rate, respiration, skin conductance, blood pressure, blood glucose composition, blood oxygen saturation, MEG, ECG, and the like. The physiological information is received from the one or more driver sensors 122. These one or more driver sensors 122 may be embedded within the vehicle inside the cabin (e.g., in the seat, in the steering wheel, in the door trim, and the like) for invasive or non-invasive sensing, or they may be physically worn by the driver (e.g., smart watches, fitness trackers, medical grade wearable sensors, glucose monitoring sensors, and the like). This current physiological information of the driver is then passed to the driver state estimation module 216.

The driver state estimation module 216 receives as input the driver characteristics from the driver behavior information module 212 and the physiological information from the driver physiological information module 214. In some embodiments, the driver state estimation module 216 also receives as input health/medical history data (i.e., historical health data) from one or more health/medical history databases 132. The health/medical history data may be from any source, such as historical data from one or health monitoring devices or software application, medical records, and the like. The health/medical history data may also include sleep history, history of emotional and psychological conditions, history of medical conditions, and the like. In some embodiments, the driver physiological information module 214 provides physiological information of the driver to the health/medical history database 132 for later use.

The driver state estimation module 216 combines the driver behavior information, the driver physiological information and/or the health/medical history data to determine one or more driver states of the driver. In other words, data regarding the driver is analyzed to make an assessment about the driver's emotional, cognitive, physiological, and physical states. FIG. 6 graphically depicts a plurality of non-limiting example driver states, wherein the x-axis is behavior (i.e., how physically active the driver is) and the y-axis is physiology (i.e., level of the driver's physiological attributes). For example, sleeping has both a low physiology level and a low behavior level. On the other hand, singing and dancing has both a high physiology level (e.g., high heart rate) and high behavior level (e.g., moving hands around).

Any known or yet-to-be-developed method of determining driver states from the driver behavior information, the driver physiological information and/or the health/medical history data. In one non-limiting example, the driver state estimation module 216 uses a Hidden Markov Model like graphical models to represent different states of the driver (and occupants) in real time. Behavioral cues from the driver behavior information module 212 are used to determine an initial observable state estimation, $S_i$, and continuous monitoring of behavior from the driver behavior information module 212 and the driver physiological information from the driver physiological information module 214 are used to compute a transition probability $Pr_{i,j}$ to determine a transfer state $S_j$ that represents a new, updated driver state estimation for the driver.

The one or more estimated driver states are provided to the driving environment assessment module 220, as described in more detail below.

Information from one or more environment sensors 124 is gathered at block 221. The one or more environment sensors 124 are operable to provide environmental data regarding roadway features and surrounding objects. A detection of roadway features module 222 detects roadway features (e.g., route, terrain, number of lanes, type of road, roadway markings), and a detection of surrounding objects module 223 detects surrounding objects (e.g., signs, buildings, other vehicles, pedestrians, and the like). It should be understood that in some embodiments, both roadway features and surrounding objects are detected by a single software module or instruction set.

The roadway features and surrounding objects may be detected by extracting features from the environment data provided by the one or more environment sensors 124, and applying one or more object detection algorithms (e.g., one or more machine learning algorithms) to detect the various roadway features and surrounding objects.

The detected roadway features and surrounding objects are passed to a detection of environment anomalies module 225 that determines how accurate the detected roadway features and the surrounding object features are. Map information 135 storing known roadway features and surrounding object data is also provided to the detection of environment anomalies module 225. The known roadway and surrounding object data includes known databases (i.e., localized map databases) of static roadway features, such as the location of traffic signs, signal lights and their state changing characteristics, lane types, lane markings, and the like. The detected roadway features and detected surrounding objects are compared with the known roadway features and known surrounding objects to determine a confidence value. Thus, detected features are matched with the known features stored in the databases to make a decision about detection confidence and anomalies. Where there is little matching between the detected roadway features and detected surrounding objects with the known roadway features and known surrounding object, a low confidence level may be provided. If the detected features fall below one or more confidence threshold levels of an object being analyzed, an anomaly flag may be set. Any method may be used to determine the confidence levels based on the comparison between the detected features and the known features. Anomalies may be present for a variety of reasons, including, but not limited to, a malfunctioning sensor, poor visibility, changes in the environment, poor sensor data, processor malfunction, and the like.

Confidence levels of one or more detected features are passed to the assessment of severity of anomalies module 226. The assessment of severity of anomalies module 226 may also receive as input map information 135 as well as real-time information from external sources 227, such as traffic data, weather data, and the like.

The assessment of severity of anomalies module 226 categorizes the anomalies into a plurality of categories based on the confidence levels. As a non-limiting example, the categories may include Mild, Moderate and Severe. For example, if the confidence threshold is below 90% but greater than or equal to 85%, the anomaly may be tagged as Mild. If the confidence threshold is between 85% and 70%, the anomaly may be tagged as Moderate. If the confidence threshold is less than or equal to 70%, the anomaly may be tagged as Severe. These threshold values can vary based on the level of sensitivity required for specific driving modes.

The one or more anomalies and/or their categories are passed to the remedy assessment module 228 along with the driver state estimations. The remedy assessment module 228 may also receive as input the map information 135 and the real time information from external sources 227. Based on the severity of the anomalies generated at the assessment of severity of anomalies module 226, the map information 135, the real-time traffic, weather and roadway information from external sources 227, and the driver state estimation, the remedy assessment module 228 generates one or more failure modes 133. The failure modes 133 provide a framework as to how the vehicle should operate in different driving situations.

The anomalies (e.g., Mild, Moderate and Severe) are assessed against real time traffic at a given time and the characteristics of the roadway at that time. Three non-limiting failure modes are as follows:

NEGOTIATIVE mode: the system will be able to negotiate the severity of anomalies and continue the operation of the vehicle;

COLLABORATIVE mode: the system will need to check with the driver state estimation to make a decision of whether to transfer the control to the driver or actuate predefined failsafe actions; and RESCUE mode: the system determines the driver is not capable of handling the anomaly condition, based on driver state estimation outcome, and set a flag for the failsafe actuator module 240.

It should be understood that more, fewer, or different failure modes may be utilized.

A non-limiting example will now be described. Suppose the assessment of severity of anomalies module 226 returns a Moderate anomaly category due to the detection confidence level of roadway features. The Moderate category is passed to the remedy assessment module 228 to assess a remedy for the present situation. Suppose the roadway is relatively clear and no surrounding traffic is present. Also, the map information 135 indicates there are geo-reference markers available within the next 100 meters. The remedy assessment module 228 may generate NEGOTIATIVE or COLLABORATIVE failure modes and continue the drive. Whereas, the same Moderate anomaly conditions could trigger a RESCUE failure mode, if the road was winding or highly congested.

COLLABORATIVE failure mode relies on the driver's ability to control the vehicle in a proper and reliable manner in a given traffic situation. The remedy assessment module 228 accesses the driver state estimation information to determine the driver's mental and physical ability to manage the traffic situation. If the driver is deemed to have a satisfactory state, the control is passed to the driver to handle the situation. Otherwise, the system will decide a NEGOTIATIVE or RESCUE failure mode.

The failure mode determined at the remedy assessment module 228 is passed to the failsafe analyzer module 230. A failsafe selector module 232 receives the failure mode, the driver state estimation, traffic data, and/or weather data to select one or more failsafe actions. Any number of failsafe actions may be generated and available for use. Several non-limiting failsafe actions are as follows:

KEEP_LANE: the vehicle will move within the boundaries of the current lane without deviating;

SLOW_DOWN: slow down in the current lane;

CHANGE_LANE: change the current path of travel to the adjacent lane;

HAZARD_ON: flash the hazard lights;

PARK: stop the vehicle and park on the current lane; and

CALL_EMERGENCY: call pre-assigned emergency numbers.

It should be understood that more, fewer or additional failsafe actions may be utilized.

The selected failsafe action is then passed to one or more failsafe engine control units (ECU) 234 that create trajectory plans based on the current traffic situation and the selected failsafe action. The failsafe action and associated trajectory plans are passed to the failsafe actuator module 240. The failsafe action and associated trajectory plans are received by a failsafe actuation module 242, which also receives the vehicle threat handling characteristics data 130 and driver threat avoidance characteristics data 131. The failsafe actuation module passes this information to decision block 244, where it is decided whether or not the driver is capable of handling the situation based on the failsafe action, the vehicle threat handling characteristics data 130, and the driver threat avoidance characteristics data 131. If the driver is capable of handling the situation, operation of the vehicle comprises enabling driver control of the vehicle at block 246. If the driver is not capable of handling the situation, operation of the vehicle comprises enabling vehicle computer control to perform the failsafe action at block 248.

As a non-limiting example, in the event the remedy assessment module 228 returns a COLLABORATIVE failure mode that requires the driver to be highly vigilant (driver state) or requires a driver to make maneuvers that are outside of driver threat avoidance capabilities, the system will actuate the failsafe actions.

It should now be understood that the embodiments of the present disclosure are directed to systems and methods of controlling a vehicle based on driver engagement. Embodiments monitor both a driver and the environment to automatically determine whether the driver should be in control of the vehicle or a vehicle computer should be in control of the vehicle. Based on driver and environment data, embodiments specify failure modes and conditions for failure actions that are broadcast to one or more vehicle processors that handle failsafe actions (e.g., slow down, change lanes, stop, and the like). A failsafe actuation module communicates with a driver state monitoring module to determine whether the driver is capable of handling the demands of controlling the vehicle based on environmental conditions. If the driver is deemed to be not capable of controlling the vehicle, the system decides the best failsafe action based on the severity of the situation and eithers changes the route or stops the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of controlling a vehicle, the method comprising:
    determining, using driver data from one or more driver sensors, a driver state estimation of a driver of the vehicle;
    determining, using environment data from one or more environmental sensors, one or more environment anomalies within an environment of the vehicle;
    determining an anomaly category for at least one of the one or more environment anomalies;
    based on the driver state estimation and one or more anomaly categories, selecting a failure mode;
    based on the failure mode, selecting at least one failsafe action; and
    determining an operation of the vehicle in accordance with the failure mode.

2. The method of claim 1, wherein determining the driver state estimation further comprises:
    determining driver behavior information of the driver corresponding to one or more driver characteristics of the driver; and
    obtaining driver physiological information of the driver.

3. The method of claim 2, wherein the one or more driver characteristics of the driver are determined by feature extraction and one or more classification algorithms.

4. The method of claim 3, wherein the one or more driver characteristics of the driver comprise at least one of gaze location, head pose, hand position, foot position, and body pose.

5. The method of claim 4, wherein determining one or more characteristics of the driver further comprises:
    generating a parametric skeleton figure of the driver; and
    determining one or more characteristics of the driver comprises determining a body posture from the parametric skeleton figure of the driver.

6. The method of claim 2, wherein:
    the driver state estimation is determined by a driver state estimation module that combines the driver behavior information and the driver physiological information; and
    the driver state estimation module uses a Hidden Markov Model to represent the driver state estimation in real time.

7. The method of claim 6, wherein the driver state estimation module determines an initial observed driver state estimation based on the driver behavior information and determines a transition probability to determine a transfer driver state estimation using a combination of the driver behavior information and the driver physiological information.

8. The method of claim 1, wherein determining the one or more environment anomalies comprises detecting one or more roadway features and one or more surrounding objects, using the one or more environmental sensors.

9. The method of claim 8, wherein:
    the one or more environment anomalies are detected by comparing the one or more detected roadway features and the one or more detected surrounding objects to one or more predetermined roadway features and one or more predetermined surrounding objects stored in a localized map database, respectively; and
    determining the one or more environment anomalies comprises determining a confidence value based on the comparison between the one or more detected roadway features and the one or more detected surrounding objects to the one or more predetermined roadway features and the one or more predetermined surrounding objects, respectively.

10. The method of claim 9, further comprising setting an anomaly flag when the confidence value is below a confidence threshold level.

11. The method of claim 9, wherein the anomaly category is based on the confidence value.

12. The method of claim 1, wherein controlling operation of the vehicle comprises:
    receiving one or more vehicle threat handling characteristics from a vehicle threat handling characteristics database;

receiving one or more driver threat avoidance characteristics from a vehicle threat avoidance characteristics database; and determining whether the driver is capable of controlling the vehicle based on the one or more vehicle threat handling characteristics, the one or more driver threat avoidance characteristics, and the failure mode, wherein:

when the driver is capable of controlling the vehicle, driver control of the vehicle is enabled; and when the driver is not capable of controlling the vehicle, computer control of the vehicle is enabled and the vehicle is autonomously controlled in accordance with the at least one failsafe action.

13. The method of claim 1, wherein determining the one or more environment anomalies further comprises:

detecting one or more roadway features and one or more surrounding objects, using the one or more environmental sensors;

determining a confidence value based on a comparison between the one or more detected roadway features and the one or more detected surrounding objects to one or more predetermined roadway features and one or more predetermined surrounding objects respectively; and setting an anomaly flag when the confidence value is below a confidence threshold level.

14. A system for controlling a vehicle, the system comprising:

one or more driver sensors for producing driver data;

one or more environmental sensors for producing environment data;

one or more processors; and non-transitory memory storing computer-readable instructions that, when executed by the one or more processors, causes the one or more processors to:

receive the driver data from the one or more driver sensors;

receive the environmental data from the one or more environmental sensors;

determine, using the driver data, a driver state estimation of a driver of the vehicle;

determine, using the environment data, one or more environment anomalies within an environment of the vehicle;

determine an anomaly category for at least one of the one or more environment anomalies;

based on the driver state estimation and one or more anomaly categories, select a failure mode;

based on the failure mode, select at least one failsafe action; and determine an operation of the vehicle in accordance with the failure mode.

15. The system of claim 14, wherein the driver state estimation is determined by:

determining driver behavior information of the driver corresponding to one or more driver characteristics of the driver; and obtaining driver physiological information of the driver.

16. The system of claim 15, wherein the one or more characteristics are determined by:

generating a parametric skeleton figure of the driver; and determining one or more driver characteristics of the driver comprises determining a body posture from the parametric skeleton figure of the driver.

17. The system of claim 15, wherein:

the driver state estimation is determined by a driver state estimation module that combines the driver behavior information and the driver physiological information; and the driver state estimation module uses a Hidden Markov Model to represent the driver state estimation in real time.

18. The system of claim 17, wherein the driver state estimation module determines an initial observed driver state estimation based on the driver behavior information and determines a transition probability to determine a transfer driver state estimation using a combination of the driver behavior information and the driver physiological information.

19. The system of claim 14, wherein:

the one or more environment anomalies are detected by comparing one or more detected roadway features and one or more detected surrounding objects to one or more predetermined roadway features and one or more predetermined surrounding objects stored in a localized map database, respectively;

determining the one or environment anomalies comprises determining a confidence value based on the comparison between the one or more detected roadway features and the one or more detected surrounding objects to the one or more predetermined roadway features and the one or more predetermined surrounding objects, respectively; and the anomaly category is based on the confidence value.

20. The system of claim 14, wherein controlling operation of the vehicle comprises:

receiving one or more vehicle threat handling characteristics from a vehicle threat handling characteristics database;

receiving one or more driver threat avoidance characteristics from a vehicle threat avoidance characteristics database; and determining whether the driver is capable of controlling the vehicle based on the one or more vehicle threat handling characteristics, the one or more driver threat avoidance characteristics, and the failure mode, wherein:

when the driver is capable of controlling the vehicle, driver control of the vehicle is enabled; and when the driver is not capable of controlling the vehicle, computer control of the vehicle is enabled and the vehicle is autonomously controlled in accordance with the at least one failsafe action.

* * * * *